July 13, 1954 W. L. SHEPHERDSON 2,683,483
DEMOUNTABLE CHAIR
Filed Sept. 5, 1950 4 Sheets-Sheet 1

Inventor
W. L. Shepherdson.
By Willard J. Grover
Attorney

July 13, 1954 — W. L. SHEPHERDSON — 2,683,483
DEMOUNTABLE CHAIR
Filed Sept. 5, 1950 — 4 Sheets-Sheet 2

Inventor
W. L. Shepherdson.
By Willard S. Ground
Attorney

July 13, 1954     W. L. SHEPHERDSON     2,683,483
DEMOUNTABLE CHAIR

Filed Sept. 5, 1950     4 Sheets-Sheet 3

Inventor
W. L. Shepherdson.
By Willard G. Grove
Attorney

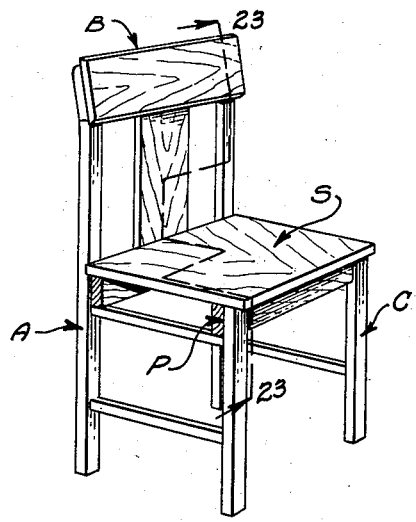
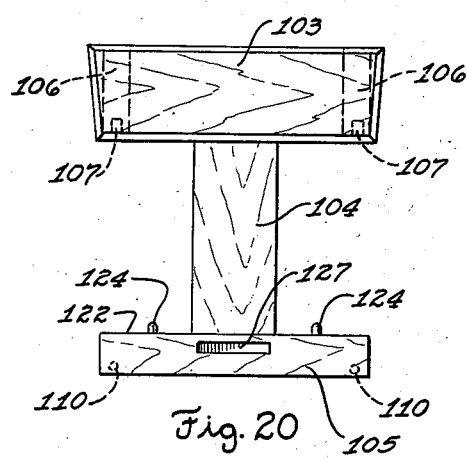
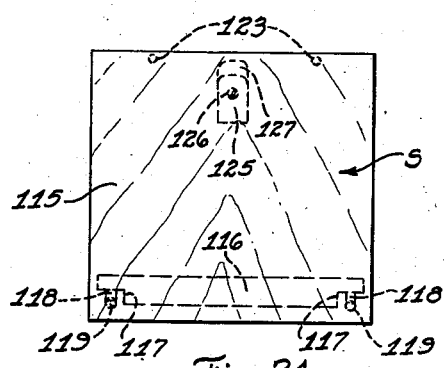
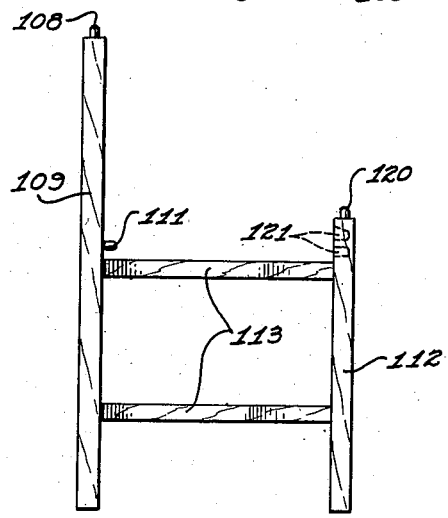
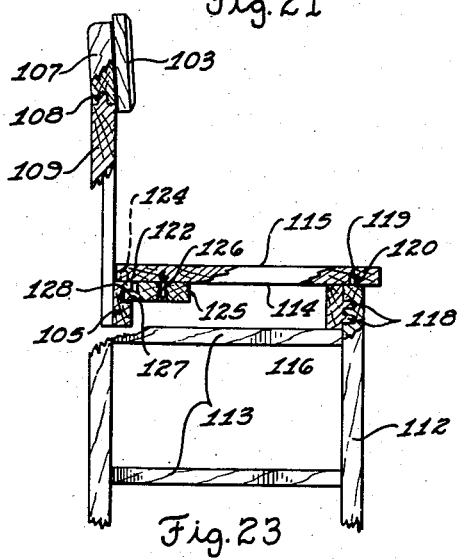
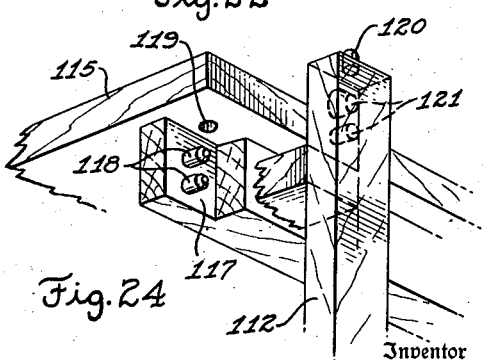

Patented July 13, 1954

2,683,483

UNITED STATES PATENT OFFICE 2,683,483

DEMOUNTABLE CHAIR

William L. Shepherdson, Phoenix, Ariz., assignor of thirty-three and one-third per cent to J. E. Meacham and thirty-three and one-third per cent to Hardy A. Norvill, both of Phoenix, Ariz.

Application September 5, 1950, Serial No. 183,190

4 Claims. (Cl. 155—196)

This invention pertains to improvements in articles of furniture and is more particularly directed to knock-down type of furniture which may be readily assembled into a rigid interlocked solid structure without the use of special fastenings of any kind.

Another object of this invention is to provide furniture of a knock-down type having interlocking mechanism for holding the assembled furniture in rigid condition while at the same time permitting its rapid and quick disassembly for purposes of packaging, shipping and storage with a minimum of wasted space.

Still another object of this invention is to provide a basic furniture structure having a minimum series of elements which may be assembled or disassembled and which are interlocked into a rigid assembly when in use.

Still another object of this invention is to provide a basic chair structure having three elements and a seat element, the seat element of which is pivotally mounted by suitable mounting means to the front of the chair structure and which is swung rearwardly and downwardly to a locked position wherein suitable latching or locking members hold the entire chair structure in a rigid assembly.

Further features and advantages of this invention will appear from a detailed description of the drawings in which:

Fig. 19 is still a fourth form of chair incorporating the features of this invention.

Fig. 20 is a front elevation of the back member of the chair shown in Fig. 19.

Fig. 21 is a plan view of the seat member of the chair shown in Fig. 19.

Fig. 22 is a left hand side elevation of one of the leg elements of the chair of Fig. 19.

Fig. 23 is a fragmentary sectional view on the line 23—23 of Fig. 19.

Fig. 24 is an enlarged fragmentary perspective view of the connection between the seat member and leg member of the chair of Fig. 19.

Figure 1:
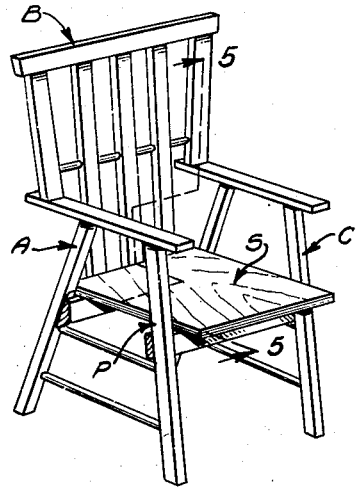
Fig. 1 is one form of chair incorporating the features of this invention.
Figure 2:
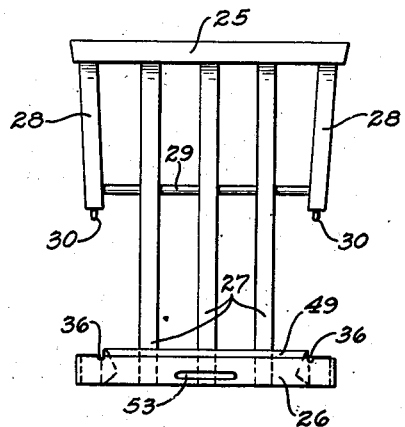
Fig. 2 is a front elevation of the back element of the chair of Fig. 1.
Figure 3:
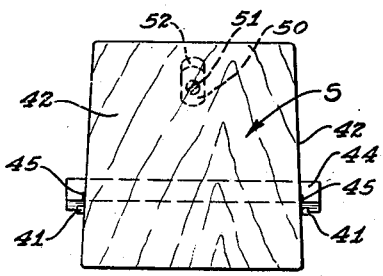
Fig. 3 is a plan view of the seat element of the chair of Fig. 1.
Figure 4:
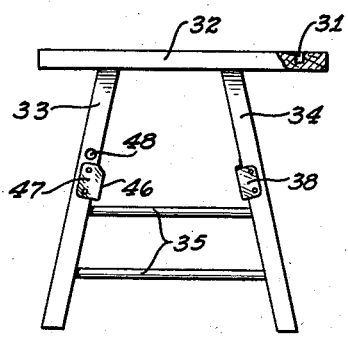
Fig. 4 is a right hand side elevation of one of the leg elements of the chair of Fig. 1.

While for illustrative purposes this invention is applied to a chair, it is to be understood that various other forms of furniture both as to design and construction may readily be adapted to the utilization of the features of this invention. Basically, the idea is to provide a chair for example having a back member B and a pair of leg members A and C and a cooperating seat member S which is pivotally mounted by a suitable interlocking connection at P in various forms to be described and which finally latches at L to the back member B to form a rigid assembly for the chair. The above described general arrangement of the chair may take various forms such as one form shown in Figs. 1 to 6 inclusive. In this arrangement there is provided the back member B consisting of the top rail 25 and the bottom rail 26 which are rigidly interconnected together by the vertical members 27. Downwardly extending from the rail member 25 are also the side members 28 having the lower ends rigidly secured to the members 27 by the cross dowel 29. The lower ends of the members 28 are provided with projecting dowel plugs 30 which are arranged to engage in dowel receiving holes 31 in the tops of the arms 32 of the leg members A and C. The leg members consist of the legs 33 and 34 rigidly secured to the arm member 32 and tied together by suitable dowels or rungs 35.

After the back member B has its dowels 30 presented into the dowel receiving holes 31 at the rear of the arms 32 the lower rail member is swung rearwardly toward the legs 34. The ends of the lower rail 26 is formed with slots 36 which are adapted to receive the tongue 37 of the member 38 fixed to the member 34. A latching lip 39 on the member 34 then snaps over the surface 40 of the member 26 to secure the back member B to the leg members A and C.

Figure 5:
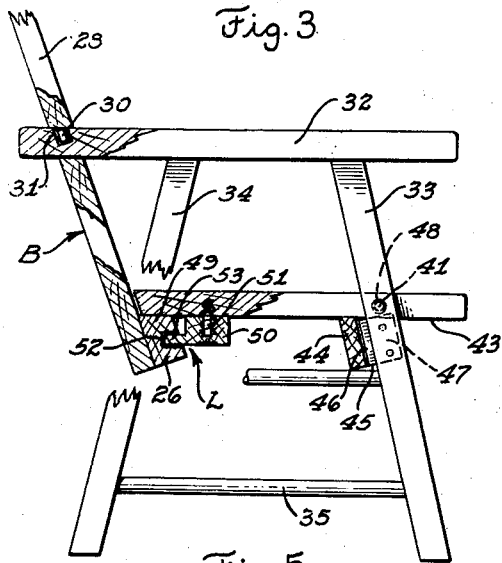
Fig. 5 is a fragmentary sectional view on the line 5—5 of Fig. 1.
Figure 6:
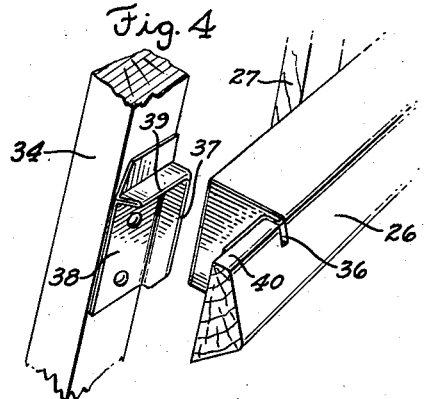
Fig. 6 is an enlarged fragmentary perspective view of one of the interlocking connections between the back and leg elements of the chair of Fig. 1.
Figure 7:
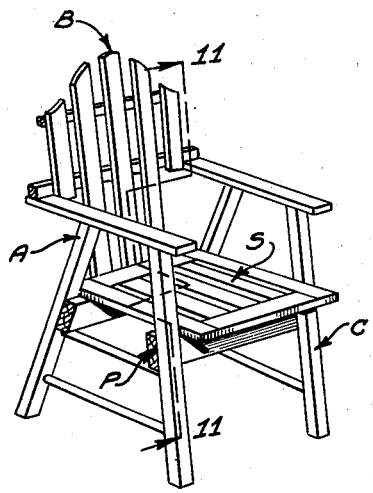
Fig. 7 is a front perspective view of a second form of chair incorporating the features of this invention.
Figure 8:
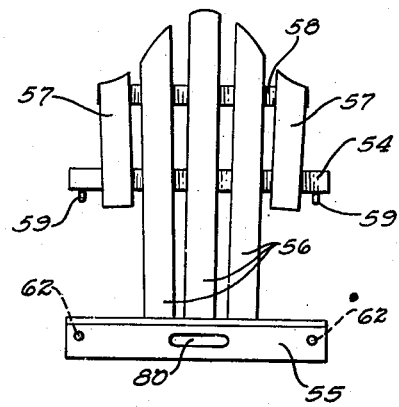
Fig. 8 is a front elevation of the back element of the chair shown in Fig. 7.
Figure 9:
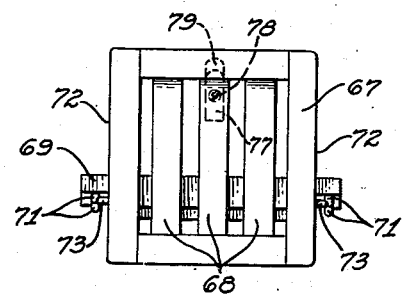
Fig. 9 is a plan view of the seat member of the chair of Fig. 7.
Figure 10:
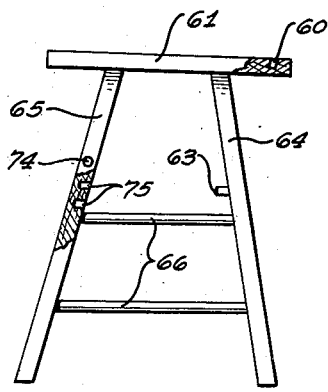
Fig. 10 is a right hand side elevation of one of the leg elements of the chair of Fig. 7.
Figure 11:
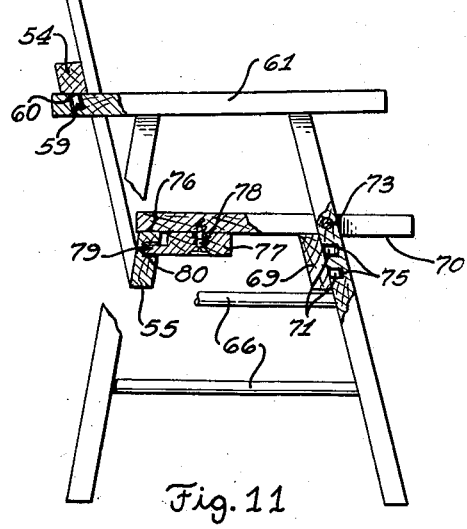
Fig. 11 is a fragmentary sectional view on the line 11—11 of Fig. 7.
Figure 12:
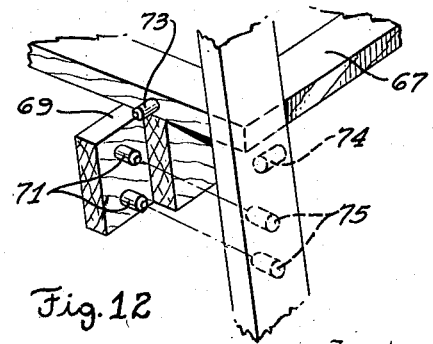
Fig. 12 is a fragmentary enlarged perspective view of the interlocking joint between the seat member and one of the leg members of the chair of Fig. 7.
Figure 13:
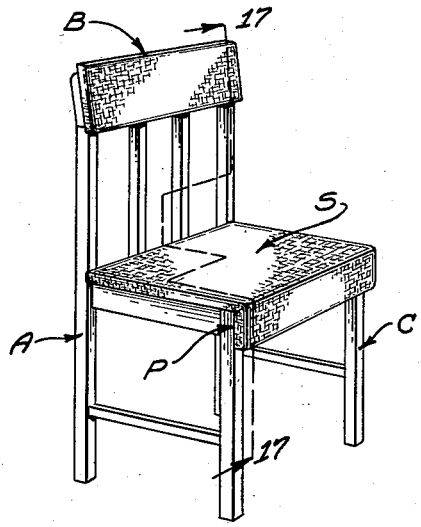
Fig. 13 is a third form of chair shown in perspective incorporating the features of this invention.
Figure 14:
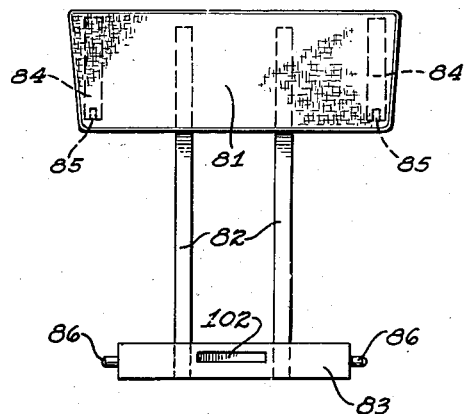
Fig. 14 is a front elevation of the back member of the chair shown in Fig. 13.
Figure 15:
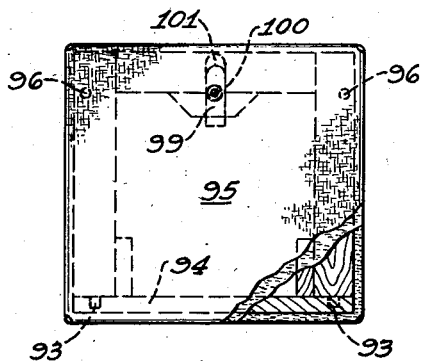
Fig. 15 is a plan view of the seat member of the chair shown in Fig. 13.
Figure 16:
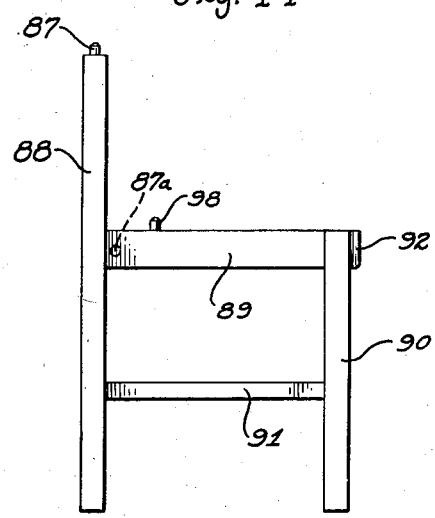
Fig. 16 is a left hand side elevation of the left hand leg member of the chair of Fig. 13.
Figure 17:
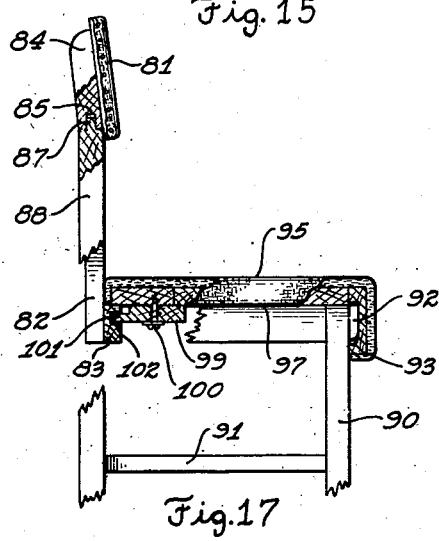
Fig. 17 is a fragmentary sectional view on the line 17—17 of Fig. 13.
Figure 18:
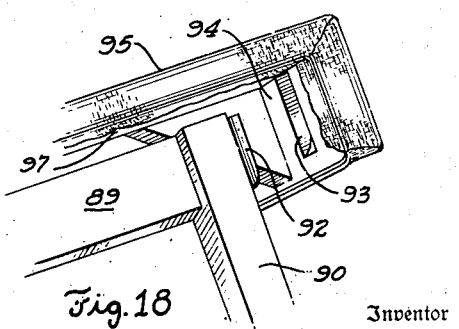
Fig. 18 is an enlarged fragmentary perspective view of the joint between the seat member and the left hand leg member of the chair of Fig. 13.

With the leg members slightly spread apart at their front portions the seat member S is then presented to the assembly of the back and leg members. The seat member S has a pair of trunnion dowels 41 rigidly secured in the side faces 42 of the seat member S. Directly behind and below these dowels on the lower surface 43 of the seat member S is secured the cross member 44 which has a pair of transverse slots 45 which are adapted to receive the lip 46 of the lock piece 47. After the seat is placed between the leg members A and C the dowels 41 are entered into dowel holes 48 formed in the inner faces of the legs 33. The seat is then swung from a diagonal position to a horizontal position as shown in Fig. 5 to bring its face 43 down against the surface 49 of the lower rail member 26 of the back B. A latch member comprising the swinging L-shaped piece 50 pivotally mounted about a suitable screw 51 is swung to bring its latching end 52 into the latch slot 53 formed in the member 26 so as to securely hold the entire chair structure together in a rigid manner.

In the second arrangement shown in Figs. 7 thru 12 inclusive there is provided the back member B comprising the upper cross member 54 and the lower cross member 55 which are secured together by the vertical slats 56. Side wing slats 57 are provided which are also secured to the cross member 54 and to a second cross member 58 which is in turn secured to the upper portions of the slats 56. The outer ends of the cross member 54 has fixed to it the downwardly extending dowel pins 59 which are arranged to engage in dowel receiving holes 60 in the arm members 61 of the side leg members A and C. The outer ends of the cross member 55 are provided with dowel receiving openings 62 which are arranged to nicely fit over the dowel plug 63 carried on the inner side of the rear legs 64 of the leg members A and C.

Each of the leg members have legs 64 and 65 which are secured to the arm members 61 and tied together at the bottom portion by the rungs 66. The seat member S in this case comprises a frame 67 having suitable cross seat slats 68 formed integral with the frame 67. A cross member 69 is fixed to the under surface 70 of the seat frame 67 and has a pair of vertically arranged dowel pins 71 in each of its ends. Also projecting from the side edges 72 of the seat frame 67 are the horizontally extending dowel pins 73 located just to the front of the cross member 69.

After the back member is assembled with the dowel pins 59 in the holes 60 of the leg members A and C, with the leg members slightly spread in their front portions, the lower member 55 of the back is swung to bring the dowel opening 62 over the dowel pin 63 to thus secure the back to the side leg members A and C. The seat member S is then placed between the front legs 65 and the dowel pins 73 are presented into the dowel openings 74 formed in the legs 65 while the seat is held in a tipped up position at the rear. The seat is then pushed downwardly and the pair of dowels 71 then enter into the dowel receiving openings 75 in the rear face of the leg 65 to thus secure the front portion of the seat to the legs 65. The seat is then pressed downwardly until its under surface 70 engages the surface 76 of the cross member 55 of the back and then a locking device comprising the swinging member 77 carried on a suitable pivot screw 78 is swung to bring its latching lug 79 into a locking slot 80 in the member 55 to thus secure the entire assembly together as a rigid structure.

Still a third form and embodiment of this invention is that shown in Figs. 13 thru 18 inclusive in which the back member B comprises the upper back pad member 81 which is connected to the vertical rungs 82 to the lower cross member 83. Vertically disposed members 84 are rigidly secured to the back of the member 81 and have dowel receiving openings 85 in their lower ends. The lower cross member 83 has the projecting dowels 86 from either of its ends. The dowel receiving openings are adapted to be placed over the dowels 87 projecting from the top ends of the rear legs 88 of the side leg members A and C, these side leg members comprising the horizontal cross rails 89 the front legs 90 and the connecting rungs 91.

The back member B is placed with its dowel receiving openings 85 over the dowels 87 and then the side members swung toward the ends of the member 83 so as to enter the dowels 86 in the dowel receiving openings 87a in the horizontal members 89 of the leg members A and C. In this manner the back member is secured to the side leg members of the chair. The horizontal members 89 project forwardly with a lug 92 over which is placed the slots 93 in the front cross member 94 of the seat pad 95 with the seat tilted upwardly at the rear. The seat is then swung downwardly to engage the dowel receiving holes 96 in the under surface 97 of the seat 95 over the upwardly projecting dowel pins 98 carried in the horizontal members 89 to thus lock the seat member to the leg members of the chair. A suitable locking device comprising the swinging member 99 carried on a suitable pivot screw 100 is swung to bring its latching lug 101 into the latching slot 102 in the bottom member 83 of the back portion B of the chair to thus securely lock the entire assembly together as a rigid structure.

And still a fourth embodiment of this invention is that shown in Figs. 19 thru 24 inclusive wherein the back member comprises the top back board 103 secured through the slat member 104 to the bottom member 105. The top board member 103 has secured to it the members 106 the lower ends of which are provided with dowel receiving openings 107 which nicely fit over the dowels 108 in the top ends of the rear legs 109 of the side leg members A and C. The back member B is placed with its dowel receiving openings 107 over the dowels 108 on the tops of the legs 109 and then the bottom portion is swung rearwardly to engage the dowel receiving openings 110 over the dowels 111 fixed to the rear legs 109 to thus secure the back and leg members together. The leg members consist of the rear legs 109 and the front legs 112 secured together by the rungs 113.

The seat portion S has secured along its front to its lower surface 114 of the seat board 115 the cross member 116 which is notched out at each end at 117 and is provided with a pair of dowel pins 118 as best seen in Fig. 24. There is also provided a dowel receiving opening 119 in the under surface 114 of the seat board 115. With the seat tilted upwardly at the rear the seat board 115 is presented with the openings 119 over and receiving the dowel pins 120 in the top of the legs 112. The seat is then swung downwardly to engage the dowel pins in the dowel pin receiving openings 121 in the rear of the front legs 112. The under surface 114 of the seat board 115 is then brought down securely against the surface 125 to engage over the mating dowels 124 in the members 105.

The latch member 125 carried on a suitable pivot screw 126 is then rotated to the position shown in Fig. 23 to bring its locking end 127 into the slot 128 in the member 105 to securely hold the entire chair assembly together.

There has thus been provided an improved article of furniture of a knock-down type consisting of a back member, two side leg members, and a seat member which may be readily assembled without supplemental fasteners or connectors into a completely rigid chair structure and which may be disassembled into its individual components to facilitate packaging, shipping and storage with a minimum of space consumption.

Having thus fully set forth and described this invention what is claimed as new is:

1. An article of furniture comprising a back member, a pair of spaced side leg members, means interconnecting said back member to the rear portions of said side leg members, a seat member, means for pivotally mounting the front portion of said seat member for free swing movement about a horizontal axis across the upper front portions of said side leg member, said means permitting relative axial movement of said seat and side leg members along said horizontal axis, and further means between said side leg member and the front portion of said seat effective to lock said side leg members against said axial movement when said seat is swung down to its normal horizontal position on said chairs.

2. An article of furniture comprising a back member, a pair of spaced side leg members, means interconnecting said back member to the rear portions of said side leg members, a seat member, means for pivotally mounting the front portion of said seat member for free swing movement about a horizontal axis across the upper front portions of said side leg member, said means permitting relative axial movement of said seat and side leg members along said horizontal axis, further means between said side leg member and the front portion of said seat effective to lock said side leg members against said axial movement when said seat is swung down to its normal horizontal position on said chairs, and a latching device on the rear portion of said seat member adapted to lock into said back member when said seat member is swung down to horizontal position to form a rigid assembly for said article of furniture.

3. In a demountable chair, a back member, a pair of spaced side leg members, a seat, means for pivotally mounting the front portion of said seat on the front portion of said side leg members for swinging about and movable axially of a transverse horizontal axis thereon, a locking device comprising inter-engaging element on the front portion of said seat and side leg member adjacent said pivotal mounting effecting to arrest relative axial movement of said seat and side leg member when said seat is swung down to horizontal position on the chair.

4. In a demountable chair, a back member, a pair of spaced side leg members, a seat, means for pivotally mounting the front portion of said seat on the front portion of said side leg members for swinging about and movable axially of a transverse horizontal axis thereon, a locking device comprising inter-engaging element on the front portion of said seat and side leg member adjacent said pivotal mounting effecting to arrest relative axial movement of said seat and side leg member when said seat is swung down to horizontal position on the chair, and latching means on the rear of said seat engaging said back member to secure said seat in horizontal position on said chair.

References Cited in the file of this patent

UNITED STATES PATENTS

| Number | Name | Date |
|--------|------|------|
| 693,197 | White | Feb. 11, 1902 |
| 984,709 | Ruggles | Feb. 21, 1911 |
| 1,240,692 | Fenton | Sept. 18, 1917 |
| 1,480,905 | Hebert | Jan. 15, 1924 |
| 1,674,220 | Percival | June 19, 1928 |
| 1,718,321 | Vericel | June 25, 1929 |
| 1,848,656 | Phenix | Mar. 8, 1932 |
| 2,364,452 | Kramer | Dec. 5, 1944 |
| 2,534,413 | Cenis | Dec. 19, 1950 |